March 21, 1933. W. F. SCHACHT 1,902,726
CASTER ROLLER
Filed May 9, 1932
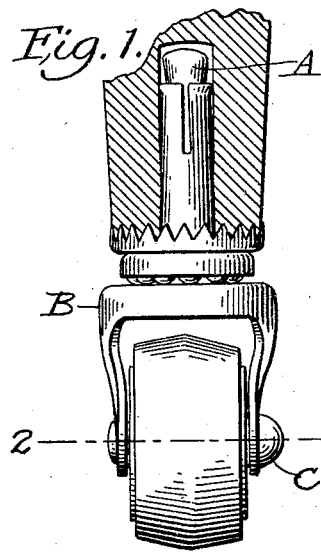
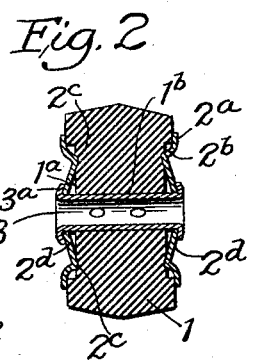
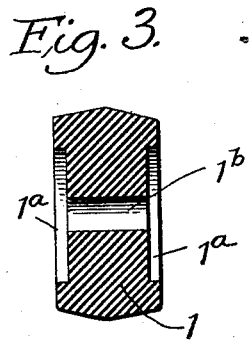
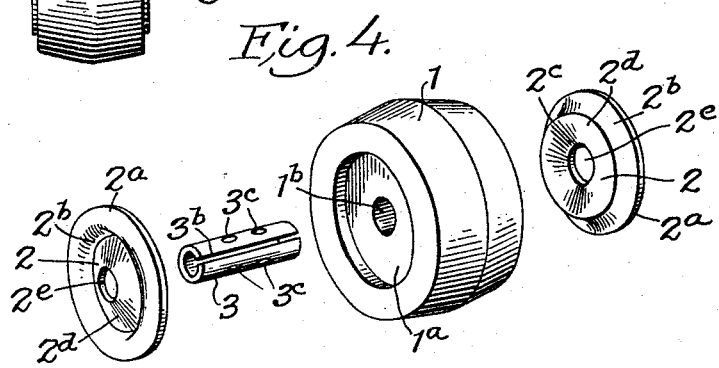
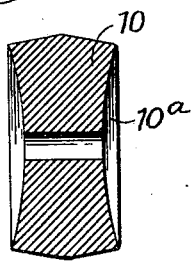
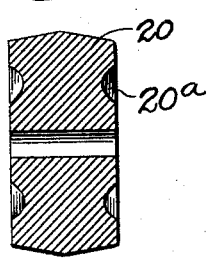
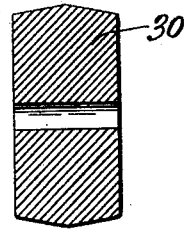
Inventor
William F. Schacht
By Alexander Powell
Attorneys Patented Mar. 21, 1933

1,902,726

UNITED STATES PATENT OFFICE

WILLIAM F. SCHACHT, OF HUNTINGTON, INDIANA

CASTER ROLLER

Application filed May 9, 1932. Serial No. 610,253.

This invention is a novel improvement in caster wheels such as shown in my co-pending application (case 7708) Serial No. 426,081, filed February 5, 1930, and in my U. S. Letters Patents Nos. 1,855,315 and 1,855,316, issued April 26, 1932, said caster rollers being particularly adapted for use on articles of furniture; and the object of the invention is to provide a caster wheel of relatively medium molded rubber, with means for preventing lateral and radial distortion of the rubber body under load, and for maintaining a crown at the periphery of the rubber wheel.

In my aforesaid application and patents the rubber body is molded with a recess in each side, or with a molded stepped recess in each side, adapted to receive a correspondingly shaped side plate or washer adapted to fit the recess snugly, the washers being held tightly compressed together by means of a tubular bushing on the axis of the body having its ends riveted or flanged over the outer faces of the side plates or washers.

I have found that it is not necessary to mold the recesses to suit the shapes of the side plates or washers and that a good substantial caster roller can be provided by omitting the recesses entirely, or by forming shallow recesses, and using concavo-convex side plates or washers with annular lateral offset rib portions adapted under compression to form recesses in the sides of the rubber body. Under compression, the side plates are forced together and the offset rib portions forced into the sides of the medium rubber body and will support the rubber body against distortion as in my aforesaid application and patents.

I will explain the invention with reference to the accompanying drawing which illustrates several practical embodiments of caster wheels constructed in accordance with my invention; and will summarize in the claims the novel features of construction, and novel combinations of parts, for which protection is desired.

In said drawing:—

Fig. 1 is a front elevation partly in section of my caster roller applied to the leg of an article of furniture.

Fig. 2 is an enlarged transverse section through the caster roller on the line 2—2, Fig. 1.

Fig. 3 is a section through the rubber body, detached.

Fig. 4 is an expanded perspective view of the parts of the roller shown in Fig. 2, separated.

Figs. 5, 6 and 7 are sections through modified forms of the rubber body.

The wheel holding portion of the caster may be of any desired type, an ordinary form being shown comprising a shank A to be engaged with a socket in the leg or part of the object to which the caster is to be applied, as indicated in Fig. 1; and having at its lower end a bifurcated member B to embrace the caster wheel and carrying the axle C on which the caster wheel is journaled.

The caster wheel shown in Figs. 2, 3, 4, comprises a resilient medium all-rubber body portion 1 molded to circular contour and having substantial width. In each side face of the body 1 near its periphery is a shallow annular recess 1a of relatively large diameter, and extending axially through the body 1 is a bore 1b.

Fitted within the recess 1a, at each side of the rubber body 1, is a concavo-convex sideplate 2 of larger diameter than that of the recess 1a, which plate need not conform in cross-section with the recess 1a in which it is fitted. Each plate 2 has a marginal flange 2a adapted to overlie the side of the wheel beyond the recess 1a (see Fig. 2) and an inwardly extending annular offset portion 2b adapted to fit in the recess 1a adjacent its periphery, the portion 2b extending relatively sharply inwardly at the marginal flange 2a to a point 2c and the inner portion of the plate 2 gradually tapering outwardly as at 2d towards the central bore 2e of the side plate, the central portion lying in substantially the plane of the marginal flange 2a, whereby the point 2c will form an annular relatively sharp shoulder adapted to dig into the medium rubber body under compression and cause the side of the body 1 to substantially conform with the contour of the side plate. The central bore 2e in each side plate 2 is adapted to register with the bore 1b in the body. The side plates 2 are preferably made of sheet metal stamped to conform to the desired area and contour.

A metallic bushing 3 is closely fitted within the axial bore 1b of the body, and the ends of the bushing project through the bores 2e in the side plates 2 and are flanged as at 3a over the outer faces of the side plates 2 as shown in Fig. 2.

In assembling the wheel the bushing 3 is inserted in the bore 1b, and plates 2 slipped over the ends of the bushing and fitted against the sides of the body; then the plates are pressed tightly against the body so as to compress the rubber therebetween and the ends of the bushing 3 flanged over the plates 2 so as to lock them securely together. As thus applied the plates 2 clamp the rubber body securely between them and substantially reinforce the body, and prevent lateral deflection or radial distortion of the body between the plates; and the annular shoulder 2c will penetrate the sides of the body within the recesses and support the outer portion of the body 1 against distortion, the outer margins of the rubber seating upon the inwardly projecting portions 2b of the plates 2 which keep the rubber from being compressed below the shoulders 2c of the side plates. The flange 2a being flared out beyond the side of the rubber body will not cut the rubber under compression; and as the flange 2a extends beyond the side of the rubber wheel, the rubber cannot rub on the bracket when in operation (as shown in Fig. 1), and there being no spaces in which the body might expand between the plates 2 consequently when pressure is applied radially inwardly on the periphery of the body, such pressure only tends to compress the central portion thereof between the plates 2, and does not loosen the body on the bushing 3.

The concavo-convex shape of the plates 2 makes them very rigid, substantial and strong.

After the wheel is assembled and connected as described it can be entered between the bifurcations of the support B and may be secured therebetween by means of a shaft C of any suitable construction; whereby the wheel is rotatably mounted upon and connected with the shank A and forms therewith a complete caster.

The bushing 3 is preferably made from a flat piece of metal rolled into cylindrical shape leaving an open slot 3b between the adjacent edges of the rolled plate. If desired the bushing might be perforated as at 3c. Such a bushing is particularly useful during the molding operation, for if the bushing is molded in the bore of the body 1 the rubber will enter and fill the slot 3b and/or perforations 3c and thus lock the bushing in the body; and such bushing so attached will cause the roller to rotate substantially noiselessly upon the pin C.

In Fig. 5 the wheel 10 has shallow concave recesses 10a instead of the shallow circular recess as in Fig. 3. The washers 2 however if used with this wheel would give substantially the same result as in Fig. 2.

In Fig. 6 annular grooves 20a are formed in the sides of the wheel 20; and in Fig. 7 no grooves or recesses are formed in the rubber body 30, but in either case the concavo-convex washers 2 would function the same as with the wheels shown in Figs. 3 and 5.

I do not limit my invention to the exact forms shown in the drawing for obviously changes could be made thereon within the scope of the claim.

I claim:

A caster wheel, comprising a molded circular solid body of rubber, having an axial bore extending therethrough; side plates each having an inwardly directed offset shoulder adjacent their peripheries closely fitted against the sides of the body, the offset shoulders being substantially V-shaped in cross-section and adapted under compression to enter into the sides of the body and maintain the sides of the body in substantial conformity with the contour of the side plates; the marginal portions of the side plates lying against the sides of the body adjacent its periphery; and means transfixing the body and connecting the side plates together with the body compressed therebetween.

WILLIAM F. SCHACHT.